United States Patent
Ito et al.

(10) Patent No.: US 10,203,626 B2
(45) Date of Patent: Feb. 12, 2019

(54) CHARGING ROLL FOR ELECTROPHOTOGRAPHIC APPARATUS

(71) Applicant: Sumitomo Riko Company Limited, Aichi (JP)

(72) Inventors: Kunio Ito, Aichi (JP); Masanori Satoh, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/032,083

(22) Filed: Jul. 11, 2018

(65) Prior Publication Data

US 2018/0321609 A1   Nov. 8, 2018

Related U.S. Application Data

(63) Continuation of application No. PCT/JP2017/016685, filed on Apr. 27, 2017.

(30) Foreign Application Priority Data

May 30, 2016   (JP) .................. 2016-107138

(51) Int. Cl.
   *G03G 15/16*   (2006.01)
   *G03G 15/02*   (2006.01)

(52) U.S. Cl.
   CPC ......... *G03G 15/0233* (2013.01); *G03G 15/16* (2013.01)

(58) Field of Classification Search
   CPC .................. G03G 15/0233; G03G 15/16
   See application file for complete search history.

(56) References Cited

U.S. PATENT DOCUMENTS

| | | | |
|---|---|---|---|
| 6,090,492 A | 7/2000 | Tsuchiya et al. | |
| 6,475,584 B1 | 11/2002 | Tsuchiya et al. | |
| 7,645,370 B2 * | 1/2010 | Tai | C23C 18/208 205/167 |

(Continued)

FOREIGN PATENT DOCUMENTS

| | | |
|---|---|---|
| JP | H07228820 | 8/1995 |
| JP | H10268613 | 10/1998 |

(Continued)

OTHER PUBLICATIONS

"International Search Report (Form PCT/ISA/210) of PCT/JP2017/016685," dated Jun. 6, 2017, with English translation thereof, pp. 1-4.

*Primary Examiner* — Francis C Gray
(74) *Attorney, Agent, or Firm* — JCIPRNET

(57) ABSTRACT

Provided is a charging roll for an electrophotographic apparatus, which includes a surface layer that suppresses bleeding of a base layer component and achieves uniform resistance by improving the dispersibility of a conductive agent. A charging roll for an electrophotographic apparatus includes a shaft body, an elastic layer that is formed on the outer circumference of the shaft body, and a surface layer that is formed on the outer circumference of the elastic layer, wherein the surface layer contains the following components (A)-(D), i.e., at least one resin (A) selected from among fluororesins and fluorine-modified acrylic resins, a carbon black (B), an ester-based polymer dispersant (C) and a sulfonic acid-based dispersant (D).

1 Claim, 1 Drawing Sheet

(56) References Cited

U.S. PATENT DOCUMENTS

2014/0045111 A1\* 2/2014 Yamamoto ........... G03G 5/0436
430/56

FOREIGN PATENT DOCUMENTS

| JP | 2005085601 A | \* | 3/2005 |
|---|---|---|---|
| JP | 2007133113 A | \* | 5/2007 |
| JP | 2007321115 A | \* | 12/2007 |
| JP | 2011232380 | | 11/2011 |

\* cited by examiner

CHARGING ROLL FOR ELECTROPHOTOGRAPHIC APPARATUS

CROSS-REFERENCE TO RELATED APPLICATIONS

This application is a continuation application of International Application number PCT/JP2017/016685, filed on Apr. 27, 2017, which claims the priority benefit of Japan Patent Application No. 2016-107138, filed on May 30, 2016. The entirety of each of the above mentioned patent applications is hereby incorporated by reference herein and made a part of this specification.

BACKGROUND

Technical Field

The present disclosure relates to a charging roll for an electrophotographic apparatus that is appropriately used in an electrophotographic apparatus such as a copier, a printer, a facsimile, or the like, in which an electrophotographic technique is employed.

Description of Related Art

In an electrophotographic apparatus such as a copier, a printer, a facsimile, or the like, in which an electrophotographic technique is employed, a conductive roll such as a charging roll, a developing roll, a transfer roll, a toner supply roll, or the like, is used.

In a conductive roll, in order to prevent adhesion of toner while reducing a variation of a resistance value due to a boundary, using a fluororesin on the outermost layer of the conductive roll has been proposed in Japanese Patent Application Laid-Open (JP-A) No. H10-268613.

In addition, in the charging roll, in order to control dispersion of conductive particles such as carbon black or the like and satisfy uniform resistivity, using a phthalocyanine compound and an acryl-based polymer dispersant in conductive fine particles while using a polyurethane resin as a binder for an enveloping layer has been proposed in Japanese Patent Application Laid-Open (JP-A) No. 2011-232380.

In a surface layer that is the outermost layer of the conductive roll such as a charging roll, a developing roll, or the like, release characteristics, resistance uniformity, surface uniformity, and so on are required. For this reason, as a material for the surface layer, paint obtained by highly dispersing a conducting agent such as carbon black in a resin such as a urethane resin or an acryl resin using a bead mill or the like is widely used as coating. However, if a binder resin for the surface layer is a urethane resin or an acryl resin, for example, when the conductive roll is left for a long time in a state in which the conductive roll is assembled to a cartridge, a base component under the surface layer bleeds to a surface of the surface layer, and a photoreceptor or the like in contact with the conductive roll is contaminated. In addition, when a fluororesin is used as the binder resin for the surface layer, compatibility with a conducting agent such as carbon black is deteriorated, dispersibility is degraded, and uniform resistance cannot be easily obtained. A technology disclosed in JP-A No. 2011-232380 is a technology in which a polyurethane resin is used as a binder resin for a surface layer and dispersion of conductive particles such as carbon black is controlled in relation with the polyurethane resin. When the fluororesin is used as the binder resin for the surface layer, even if a phthalocyanine compound and an acryl-based polymer dispersant are used, dispersibility of the conductive particles such as carbon black or the like is insufficient, and uniform resistance cannot be easily obtained.

SUMMARY

The present disclosure provides a charging roll for an electrophotographic apparatus including a surface layer capable of improving dispersibility of a conducting agent and obtaining uniform resistance while suppressing bleeding of a base component.

A charging roll for an electrophotographic apparatus according to the present disclosure includes a shaft body; an elastic body layer formed on an outer circumference of the shaft body; and a surface layer formed on an outer circumference of the elastic body layer, wherein the surface layer contains the following (A) to (D): at least one resin (A) selected from fluororesins and fluorine-modified acryl resins, a carbon black (B), an ester-based polymer dispersant (C), and a sulfonic acid-based dispersant (D).

DESCRIPTION OF THE EMBODIMENTS

Description of Embodiments

Figure 1A:
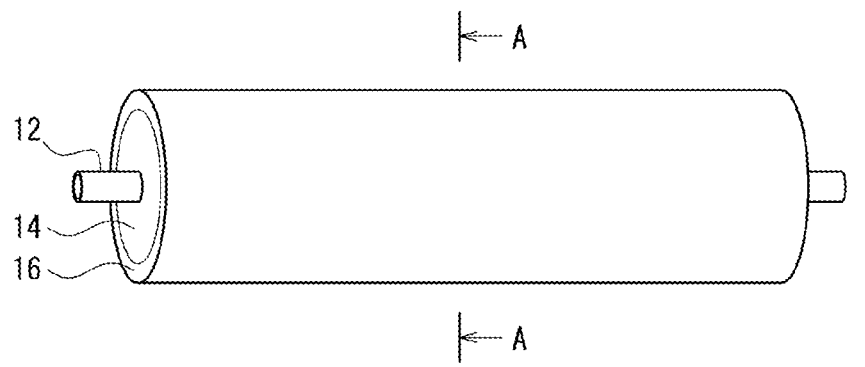
FIG. 1(a) is an external schematic view of a charging roll for an electrophotographic apparatus according to a first embodiment of the present disclosure.
Figure 1B:
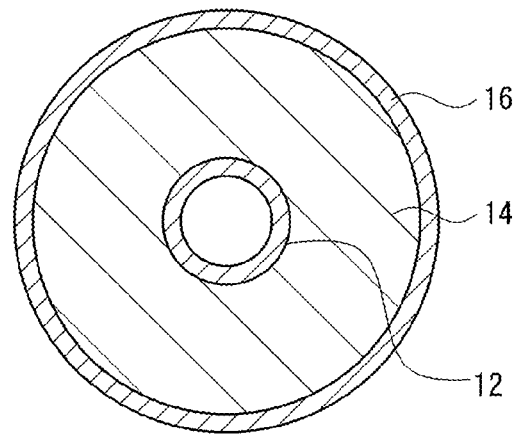
FIG. 1(b) is a cross-sectional view taken along line A-A in FIG. 1(a).

A charging roll for an electrophotographic apparatus (hereinafter, simply referred to as a charging roll) according to the present disclosure will be described in detail. FIG. 1(a) is an external schematic view of a charging roll for an electrophotographic apparatus according to a first embodiment of the present disclosure, and FIG. 1(b) is a cross-sectional view taken along line A-A in FIG. 1(a).

A charging roll 10 includes a shaft body 12, an elastic body layer 14 formed on an outer circumference of the shaft body 12, and a surface layer 16 formed on an outer circumference of the elastic body layer 14. The elastic body layer 14 (a base layer) is a layer serving as a base of the charging roll 10. The surface layer 16 (the outermost layer) is a layer formed on a surface of the charging roll 10.

The surface layer 16 contains the following (A) to (D):
at least one resin (A) selected from fluororesins and fluorine-modified acryl resins;
a carbon black (B);
an ester-based polymer dispersant (C); and
a sulfonic acid-based dispersant (D).

The resin (A) is a binder resin in the surface layer 16. The fluororesins and the fluorine-modified acryl resins are resins containing a fluorine group. These resins have a high barrier property and can suppress bleeding of a base component. In addition, these resins have a good antifouling property, and can suppress adhesion of toner, toner external additives, or the like, to the surface layer 16.

Examples of the fluororesins include polytetrafluoroethylene (PTFE), polychloro-trifluoroethylene (PCTFE), polyvinylidene fluoride (PVDF), polyvinyl fluoride (PVF), tetrafluoroethylene-perfluoroalkylvinyl ether copolymers (PFA), tetrafluoroethylene-hexafluoropropylene copolymer (FEP), ethylene-tetrafluoroethylene copolymer (ETFE), ethylene-chlorotrifluoroethylene copolymer (ECTFE), tetrafluorethylene-hexafluoropropylene-vinylidene fluoride copolymer (THV), tetrafluororethylene-vinylidene fluoride copolymer, hexafluoropropylene-vinylidene fluoride copolymer, and the like.

The fluorine-modified acryl resin is a resin having a fluorinated organic group in a polymer-side chain of an acrylate resin. Examples of the fluorinated organic group include a perfluoroalkyl group, a partially fluorinated alkyl group, and the like. While a carbon number of the fluorinated organic group is not particularly limited, a carbon number of 1 to 20 is preferable. Examples of the fluorine-modified acryl resins include one or two or more polymers of fluorinated (meth)acrylates formed of acryl esters such as perfluoroalkyl (meth)acrylates, partially fluorinated alkyl (meth)acrylates, and the like, or polymers of one or two or more fluorinated (meth)acrylates and one or more (meth)acrylates that are not fluorine-modified. The (meth)acrylates that are not fluorine-modified may contain polysiloxane group-containing (meth)acrylates according to necessity. An antifouling property of the fluorine-modified acryl resin can be further increased by copolymerization of the polysiloxane group-containing (meth)acrylate. Further, fluorine-modified acryl resins are disclosed in Japanese Patent Application Laid-Open (JP-A) No. H07-228820.

The resin (A) preferably has solubility in a solvent so that the surface layer 16 can be formed as a uniform layer through coating, or the like. The solvent may be any one of water and an organic solvent. Examples of the organic solvent include MEK, MIBK, hexane, toluene, ethyl acetate, butyl acetate, THF, DMF, NMP, and the like. A solid element concentration of paint may be adjusted within a range of, for example, 3 to 50 wt %. In view of having solubility in the solvent, the resin (A) is preferably a fluororesin such as polyvinylidene fluoride (PVDF), polyvinylidene fluoride/tetrafluoroethylene copolymer, polyvinylidene fluoride/hexafluoropropylene, tetrafluoroethylene/hexafluoropropylene/vinylidene fluoride copolymer (THV), or the like, or a fluorine-modified acryl resin.

The carbon black of (B) is mixed as a conducting agent (an electron conducting agent). The carbon black is mixed such that a volume resistivity of the surface layer 16 is within a desired range. The volume resistivity of the surface layer 16 may be appropriately set within a range of $10^5$ to $10^{11}$ Ω/cm, $10^8$ to $10^{10}$ Ω/cm, or the like, according to a use or the like. In view of setting the volume resistivity of the surface layer 16 within an appropriate range, a blending quantity of the carbon black (B) is preferably within a range of 3.0 to 80 part by weight with respect to a binder resin of 100 part by weight. More preferably, the blending quantity of the carbon black may be within a range of 7 to 70 part by weight.

In view of improving dispersibility, the carbon black (B) preferably has a particle diameter (a dispersion diameter) within a range of 0.01 to 5.0 μm. More preferably, the particle diameter is within a range of 0.1 to 1 μm. As the ester-based polymer dispersant (C) is used, the particle diameter (B) can be within the above-mentioned range. The particle diameter of the carbon black (B) can be measured by UPA from Microtrac Inc. The dispersion diameter is a particle diameter of the carbon black (B) in a preparation containing a solvent or a particle diameter of the carbon black (B) in the surface layer. The carbon black is covered with the dispersant, and there is no variation in dispersion diameter in the preparation and no variation in dispersion diameter in the surface layer. A primary particle diameter of the carbon black to be used is preferably within a range of 5 to 100 nm. More preferably, the primary particle diameter is within a range of 10 to 50 nm.

Examples of the ester-based polymer dispersant (C) include a dispersant formed of a higher fatty acid ester, a dispersant formed of a polyester, or the like. In view of adhesion to the surface of the carbon black (B) and easy suppression of aggregation of the carbon black (B) due to a physical steric hindrance, a molecular weight of the higher fatty acid ester is preferably 1,000 to 150,000. More specifically, the molecular weight is 5,000 to 100,000. While a molecular weight (a weight average molecular weight) of the polyester is not particularly limited, in view of adhesion to the surface of the carbon black (B) and easy suppression of aggregation of the carbon black (B) due to the physical steric hindrance, the molecular weight of the higher fatty acid ester is preferably 1,000 to 150,000. More specifically, the molecular weight is 5,000 to 100,000. The ester-based polymer dispersant (C) may have a carboxylic acid group or an amide group. Accordingly, there is an advantage that compatibility with the sulfonic acid-based dispersant (D) is further improved.

As the ester-based polymer dispersant (C), specifically, for example, "DISPERBYK-130," "DISPERBYK-161," "DISPERBYK-162," "DISPERBYK-163," "DISPERBYK-170," "DISPERBYK-171," "DISPERBYK-174," "DISPERBYK-180," "DISPERBYK-182," "DISPERBYK-183," "DISPERBYK-184," "DISPERBYK-185," "DISPERBYK-2000," "DISPERBYK-2001," "DISPERBYK-2020," "DISPERBYK-2050," "DISPERBYK-2070," "DISPERBYK-2096" or "DISPERBYK-2150" from BYK Chemie GmbH, "EFKA1503," "EFKA4010," "EFKA4020," "EFKA4300," "EFKA4330," "EFKA4340," "EFKA4520," "EFKA4530," "EFKA5054," "EFKA7411," "EFKA7422," "EFKA7431," "EFKA7441," "EFKA7461," "EFKA7496" or "EFKA7497" from Ciba Specialty Chemicals Inc., "Solsperse 3000," "Solsperse 9000," "Solsperse 13240," "Solsperse 13650," "Solsperse 13940," "Solsperse 17000," "Solsperse 18000," "Solsperse 20000," "Solsperse 21000," "Solsperse 20000," "Solsperse 24000," "Solsperse 26000," "Solsperse 27000," "Solsperse 28000," "Solsperse 32000," "Solsperse 36000," "Solsperse 37000," "Solsperse 38000," "Solsperse 41000," "Solsperse 42000," "Solsperse 43000," "Solsperse 46000," "Solsperse 54000" or "Solsperse 71000" from Lubrizol Corp., "Ajisper PB-711," "Ajisper PB-821," "Ajisper PB-822," "Ajisper PB-814" or "Ajisper PB-824" from Ajinomoto Fine-Techno Co., Inc., or the like may be used.

While the blending quantity of the ester-based polymer dispersant (C) is not particularly limited, in view of an excellent effect of suppressing aggregation of the carbon black (B), the blending quantity is preferably within a range of 1 to 100 part by weight with respect to 100 part by weight of the carbon black (B). More specifically, the blending quantity is within a range of 5 to 40 part by weight.

The sulfonic acid-based dispersant (D) is a dispersant having a sulfonate group. The sulfonate group includes both of sulfonic acid ($-SO_3H$) and sulfonate ($-SO_3M$). M represents a monovalent or polyvalent metal or amine. Since the sulfonic acid-based dispersant (D) has the same potential as the fluororesin or the fluorine-modified acryl resin, an electric potential of which easily becomes negative, as the sulfonic acid-based dispersant has the sulfonate group, an effect of compatibilizing the fluororesin or the fluorine-modified acryl resin of resin (A) and the ester-based polymer dispersant (C) is provided, and as a result, the carbon black can be highly dispersed in the fluororesin or the fluorine-modified acryl resin. Accordingly, a uniform resistance is obtained in the fluororesin or the fluorine-modified acryl resin.

In view of compatibility between the CB, the polymer dispersant and the fluorine, the sulfonic acid-based dispersant (D) is preferably a phthalocyanine compound having a sulfonate group. Examples of the phthalocyanine compound having the sulfonate group include metal phthalocyanines having a sulfonate group, for example, copper phthalocyanine having a sulfonate group, or the like.

While a blending quantity of the sulfonic acid-based dispersant (D) is not particularly limited, a weight ratio between the ester-based polymer dispersant (C) and the sulfonic acid-based dispersant (D) is preferably within a range of (C):(D)=1:1 to 4:1. More specifically, the weight ratio is within a range of (C):(D)=1.5:1 to 3:1.

The binder resin in the surface layer 16 may be formed of only the resin (A), and in addition to the resin (A), another resin used as the binder resin of the surface layer may be used within a range in which at least the barrier property is secured. For this reason, the resin (A) is preferably 50 wt % or more with respect to the entire binder resin. More specifically, the resin is 60 wt % or more. Preferable examples of the other resin include acryl resins, ester resins, carbonate resins, phenol resins, melamine resins, polyurethane resins, and the like. While the acryl resin used in addition to the resin (A) may be any one of the modified acryl resin and the non-modified acryl resin, the resin may be at least an acryl resin that is not fluorine-modified. Examples of such acryl resins include, specifically, alkyl esters of acrylic acid or methacrylic acid, hydroxyalkyl esters, glycidyl esters, and the like. Examples of the alkyls of the alkyl esters include methyl, ethyl, butyl, octyl, dodecyl, and the like. Examples of the hydroxyalkyls of the hydroxyalkyl esters include hydroxyethyl, hydroxybutyl, and the like.

The surface layer 16 may or may not include additives in addition to (A) to (D). Examples of the additives include a leveling agent, a coupling agent, a conducting agent, a stabilizing agent, an ultraviolet absorbing agent, a lubricant, a mold releasing agent, a dye, a pigment, a flame retardant, and the like. Examples of the conducting agent include an ion conducting agent (a quaternary ammonium salt, a borate, a surfactant, or the like) and an electron conducting agent (graphite, c-$TiO_2$, c-ZnO, c-$SnO_2$ (c-means conductivity) or the like).

A thickness of the surface layer 16 is not particularly limited and may be appropriately set within a range of 10 to 30 μm or the like according to a use or the like.

The surface layer 16 can be formed by painting a composition for forming the surface layer including (A) to (D) on an outer circumferential surface of the elastic body layer 14 and appropriately drying the composition. The composition for forming the surface layer can be prepared using a solvent that dissolves or disperses (A) to (D). The solvent may be any one of water and an organic solvent. Examples of the organic solvent include MEK, MIBK, hexane, toluene, ethyl acetate, butyl acetate, THF, DMF, NMP, and the like. A solid element concentration of the paint may be adjusted within a range of, for example, 3 to 50 wt %.

The elastic body layer 14 contains a crosslinked rubber. The elastic body layer 14 is formed of conductive rubber composition containing an uncrosslinked rubber. The crosslinked rubber is obtained by crosslinking the uncrosslinked rubber. The uncrosslinked rubber may be a polar rubber or a non-polar rubber. In view of excellent conductivity or the like, the uncrosslinked rubber is more preferably a polar rubber.

The polar rubber is a rubber having a polar group, and examples of the polar group include a chlorine group, a nitrile group, a carboxyl group, an epoxy group, and the like. Examples of the polar rubber include, specifically, a hydrin rubber, a nitrille rubber (NBR), a urethane rubber (U), an acrylic rubber (a copolymer between an acrylic acid ester and 2-chloroethylvinylether, ACM), a chloroprene rubber (CR), an epoxynized natural rubber (ENR), and the like. Among the polar rubbers, in viewpoint the particular ease with which their volume resistivity is lowered, a hydrin rubber and a nitrille rubber (NBR) are more preferable.

Examples of the hydrin rubber include a homopolymer (CO) of epichlorohydrin, an epichlorohydrin-ethylene oxide bipolymer (ECO), an epichlorohydrin-allyl glycidyl ether bipolymer (GCO), an epichlorohydrin-ethylene oxide-allyl glycidyl ether terpolymer (GECO), and the like.

Examples of the urethane rubber include a polyether type urethane rubber having an ether linkage in a molecule. The polyether type urethane rubber is manufactured by a reaction of a polyether having a hydroxyl group at both ends and a diisocyanate. While the polyether is not particularly limited, examples of the polyether include polyethylene glycol, polypropylene glycol, and the like. While the diisocyanate is not particularly limited, examples of the diisocyanate include tolylene diisocyanate, diphenyl methane diisocyanate, and the like.

Examples of the non-polar rubber include an isoprene rubber (IR), a natural rubber (NR), a styrene butadiene rubber (SBR), a butadiene rubber (BR), and the like.

Examples of the crosslinking agent include a sulfur crosslinking agent, a peroxide crosslinking agent and a dechlorinated crosslinking agent. These crosslinking agents may be used alone or two or more crosslinking agents may be used in combination.

Examples of the sulfur crosslinking agent include known sulfur crosslinking agents in the related art such as powdery sulfur, precipitated sulfur, colloidal sulfur, surface-treated sulfur, insoluble sulfur, sulfur chloride, a thiuram-based vulcanization promoter, polymer polysulfides, and the like.

Examples of the peroxide crosslinking agent include known peroxide crosslinking agents in the related art such as peroxy ketals, dialkyl peroxides, peroxy esters, ketone peroxides, peroxy dicarbonate, diacyl peroxide, hydroperoxide, and the like.

Examples of the dechlorinated crosslinking agent include dithiocarbonate compounds. More specific examples of the dechlorinated crosslinking agent include quinoxaline-2,3-dithiocarbonate, 6-methyl quinoxaline-2,3-dithiocarbonate, 6-isopropyl quinoxaline-2,3-dithiocarbonate, 5,8-dimethyl quinoxaline-2,3-dithiocarbonate, and the like.

In view of preventing bleeding or the like, a blending quantity of the crosslinking agent is preferably within a range of 0.1 to 2 part by weight, more preferably within a range of 0.3 to 1.8 part by weight, and even more preferably within a range of 0.5 to 1.5 part by weight with respect to the uncrosslinked rubber of 100 part by weight.

The crosslinking agent may be used along with a dechlorinated crosslinking promoter when the dechlorinated crosslinking agent is used. Examples of the dechlorinated crosslinking promoter include 1,8-diazabicyclo(5,4,0)undecene-7 (hereinafter, abbreviated as DBU) and a weak acid salt thereof. While the dechlorinated crosslinking promoter may be used as a form of DBU, the promoter may be used as a form of the weak acid salt from handleability thereof.

Examples of the weak acid salt of DBU include a carbonate, a stearate, a 2-ethylhexylate acid salt, a benzonate, a salicylate, a 3-hydroxy-2-naphthoic acid salt, a phenol resin salt, a 2-mercaptobenzothiazole salt, a 2-mercaptobenzoimidazole salt, and the like.

In view of preventing bleeding or the like, a content of the dechlorinated crosslinking promoter is preferably within a range of 0.1 to 2 part by weight with respect to the uncrosslinked rubber of 100 part by weight. The content is more preferably within a range of 0.3 to 1.8 part by weight and even more preferably within a range of 0.5 to 1.5 part by weight.

A known conducting agent in the related art such as carbon black, graphite, c-$TiO_2$, c-ZnO, c-$SnO_2$ (c-means conductivity), an ion conducting agent (quaternary ammonium salt, borate, surfactant, or the like), or the like, can be appropriately added to the elastic body layer 14 in order to apply conductivity. In addition, various additives may be appropriately added according to necessity. Examples of the additives include a lubricant, a vulcanization accelerator, an anti-oxidizing agent, a light stabilizer, a viscosity modifier, a processing aid, a flame retardant, a plasticizer, a foaming agent, a filler, a dispersant, an antifoaming agent, a pigment, a mold releasing agent, and the like.

The elastic body layer 14 can be adjusted to a predetermined volume resistivity according to a type of the crosslinked rubber, a blending quantity of the ion conducting agent, mixing of the electron conducting agents, or the like. The volume resistivity of the elastic body layer 14 may be appropriately set within a range of $10^2$ to $10^{10}$ Ω/cm, $10^3$ to $10^9$ Ω/cm, $10^4$ to $10^8$ Ω/cm, or the like, according to a use or the like.

A thickness of the elastic body layer 14 is not particularly limited and may be appropriately set within a range of 0.1 to 10 mm or the like according to a use or the like.

The elastic body layer 14 may be manufactured, for example, as follows. First, the elastic body layer 14 is formed on the outer circumference of the shaft body 12 by coaxially installing the shaft body 12 with a hollow section of the roll foaming mold, injecting, heating/curing (crosslinking) the uncrosslinked conductive rubber composition and removing a mold, or extruding the uncrosslinked conductive rubber composition onto the surface of the shaft body 12.

The shaft body 12 is not particularly limited as long as the shaft body 12 has conductivity. Specifically, a core or the like constituted by a solid body or a hollow body formed of a metal such as iron, stainless steel, aluminum, or the like, may be exemplified. An adhesive agent, a primer, or the like, may be applied to the surface of the shaft body 12 according to necessity. That is, the elastic body layer 14 may be adhered to the shaft body 12 via an adhesive agent layer (a primer layer). The adhesive agent, the primer, or the like may be made conductive according to necessity.

According to the charging roll 10 having the above-mentioned configuration, since one or more resins selected from the fluororesins and the fluorine-modified acryl resins are used as the binder resin of the surface layer 16, a barrier property can be increased, and bleeding of the component of the elastic body layer 14 serving as the base layer can be suppressed. Then, since the polymer dispersant is used with respect to the carbon black, aggregation of the carbon black can be suppressed by the steric hindrance. Further, the ester-based polymer dispersant, the fluororesin and the fluorine-modified acryl resin can be compatibilized using the ester-based polymer dispersant as the polymer dispersant while using the sulfonic acid-based dispersant having the same potential as the fluororesin or the fluorine-modified acryl resin, the electric potential of which can easily become negative, and as a result, the carbon black can be highly dispersed in the fluororesin or the fluorine-j acryl resin. Accordingly, uniform resistance is obtained in the fluororesin or the fluorine-modified acryl resin.

The configuration of the charging roll according to the present disclosure is not limited to the configuration shown in FIGS. 1(a) and 1(b). For example, in the charging roll 10 shown in FIGS. 1(a) and 1(b), another elastic body layer may be provided between the shaft body 12 and the elastic body layer 14. In this case, the other elastic body layer is a layer serving as a base of the charging roll, and the elastic body layer 14 functions as a resistance adjustment layer or the like that performs resistance adjustment of the charging roll. The other elastic body layer can be formed of, for example, any one of materials exemplified as materials that constitute the elastic body layer 14. In addition, for example, in the charging roll 10 shown in FIGS. 1(a) and 1(b), the other elastic body layer may be provided between the elastic body layer 14 and the surface layer 16. In this case, the elastic body layer 14 is a layer that becomes a base of the charging roll, and the other elastic body layer functions as a resistance adjustment layer or the like that performs resistance adjustment of the charging roll.

EXAMPLES

Hereinafter, the present disclosure will be described in detail using examples and comparative examples.

Examples 1 to 6, Comparative Examples 1 to 8

<Preparation of Conductive Rubber Composition>

A conductive rubber composition was prepared by adding a vulcanization assistant (zinc oxide, "2 types of zinc oxide" manufactured by Mitsui Mining & Smelting Co., Ltd.) at 5 part by weight, carbon ("Ketjen Black EC300J" manufactured by Ketjen Black International Co., Ltd.) at 10 part by weight, a vulcanization promotor (2-mercaptobenzothiazole, "Nocceler M-P" manufactured by Ouchi Shinko Chemical Industrial Co., Ltd.) at 0.5 part by weight, sulfur ("SULFAX PTC" manufactured by Tsurumi Chemical Industry Co., Ltd.) at 2 part by weight and a filler (calcium carbonate, "Hakuenka CC" manufactured from Shiraishi Kogyo Co., Ltd.) at 50 part by weight to hydrin rubber (ECO, "Epichlomer CG102" manufactured from Daiso Sangyo Co., Ltd.) of 100 part by weight, and agitating and mixing them using agitator.

<Fabrication of Elastic Body Layer>

The elastic body layer having a thickness of 1.5 mm was formed on an outer circumference of a core by setting the core (the shaft body, a diameter of 6 mm) in a forming mold, injecting the conductive rubber composition, heating the composition at 170° C. for 30 minutes, and then cooling the composition and removing the mold.

<Fabrication of Surface Layer>

The composition for forming the surface layer was prepared by mixing a binder resin, carbon black, dispersants 1 and 2 and a solvent (MEK) composed as composition disclosed in Table 1 such that a solid element concentration was 15 wt %. Next, the surface layer having a thickness of 2.5 μm was formed on the outer circumference of the elastic body layer by roll-coating the prepared composition for forming the surface layer on the elastic body layer, heating the composition at 100° C. for 30 minutes and removing the solvent. Accordingly, the charging roll was fabricated.

Further, the materials used were as follows.
(Binder Resin)
Fluororesin: tetrafluoroethylene-hexafluoropropylene-vinylidene fluoride copolymer (THV), "Dyneon THV221AZ" manufactured by 3M
Fluorine-modified acryl resin: "GF150" manufactured by ToaGosei Co., Ltd.
Acryl resin: "High-Peal M4501" manufactured by Negami Chemical Industrial Co., Ltd. (Non-fluorine-degeneration)
Urethane resin: "Miractran E380PNAT" manufactured by Tosoh Co., Ltd. (Carbon black)
"Ketjen Black EC300J" manufactured by Ketjen Black International Co., Ltd.
(Dispersant 1)
Higher fatty acid ester (ester-based polymer dispersant): "Ajisper PN411" manufactured by Ajinomoto Fine Techno Co., Inc.
Comblike polymer ester (ester-based polymer dispersant): "Solsperse S32000," manufactured by Nippon Lubrizol Corp. and containing a polyvalent carboxylic acid partial amide
Comblike polymer ester (ester-based polymer dispersant): "DISPERBYK-182" manufactured by BYK Chemie Japan
Acryl-based polymer dispersant: "EFKA-4406" manufactured by BASF Japan
(Dispersant 2)
Sulfonate group-containing copper phthalocyanine (sulfonic acid-based dispersant): "Solsperse S12000" manufactured by Nippon Lubrizol Co., Ltd.
Polystyrene sulfonic acid Na (sulfonic acid-based dispersant): "Polinas" manufactured by Tosoh Co., Ltd.

light and shade nonuniformity of a roll pitch occurred was represented as poor with "C," the case in which the light and shade nonuniformity did not occur was represented as good with "B," and articles having no light and shade nonuniformity and no gathering of images were represented as best with "A."

(Resistance Evaluation)

Under the NN boundary (23° C. 50% RH), the current value when the charging roll was in line contact with a metal rod (φ30 mm), the metal rod was rotated in a state in which loads of 300 g each were applied to both ends of the shaft body, the charging roll was turned and rotated at 30 rpm, and a direct current voltage of 200 V from an end portion of the shaft body was applied was measured. Here, a ratio (max/min) of the maximum value and the minimum value of the current value was calculated, the case in which the ratio exceeded 2.0 was represented as "C" showing that resistance nonuniformity was large, the case in which the ratio of 2.0 or less was represented as "B" showing that the resistance nonuniformity was small, and the case in which the ratio was 1.3 or less was represented as "A" showing that the resistance nonuniformity was extremely small.

(Bleeding Evaluation)

The fabricated charging roll was attached to a cartridge of a real machine ("CLJ4525dn" manufactured by HP Development Company, L.P.) and left under a 40° C.×95% RH boundary for 30 days, and the roll surface was observed by a microscope. The case in which generation of a bleeding substance on the roll surface was recognized was represented as "C," and the case in which the bleeding substance was not recognized was represented as "B."

TABLE 1

| | | Examples | | | | | | Comparative Examples | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Binder resin | Fluororesin | 100 | | 60 | 100 | 100 | 50 | | 100 | 100 | 100 | 100 | 100 | 100 | 100 |
| | Fluorine-modified acryl resin | | 100 | | | | 20 | | | | | | | | |
| | Acryl resin | | | 40 | | | 30 | | | | | | | | |
| | Urethane resin | | | | | | | 100 | | | | | | | |
| Carbon black | | 20 | 20 | 20 | 20 | 20 | 20 | 20 | 20 | 20 | 20 | 20 | 20 | 20 | 20 |
| Dispersant 1 | Higher fatty acid ester | 2 | 2 | 2 | 2 | | | 2 | | 2 | | 2 | | | |
| | Comblike polymer ester | | | | | 2 | 2 | | | | | | | | |
| | Comblike polymer ether | | | | | | | | | | | | | 2 | 2 | |
| | Acryl-based polymer dispersant | | | | | | | | | | | | | | | 2 |
| Dispersant 2 | Sulfonate group-containing copper phthalocyanine | 1 | 1 | 1 | | 1 | 1 | 1 | | 1 | | 1 | | | 1 |
| | Polystyrene sulfonate Na | | | | 1 | | | | | | | | | | |
| | Polyether phosphate ester | | | | | | | | | | | | 1 | | 1 | |
| Image evaluation | | B | B | B | B | A | A | B | C | C | C | C | C | C | C |
| Resistance evaluation | | B | B | B | B | A | A | B | C | C | C | C | C | C | C |
| Bleeding evaluation | | B | B | B | B | B | B | C | B | x | B | B | B | B | B |

Polyether phosphate ester: "Disperon DA375" manufactured by Kusumoto Chemicals, Ltd.

Image evaluation (light and shade nonuniformity), resistance evaluation (resistance nonuniformity) and bleeding evaluation were performed on the fabricated charging rolls. Evaluation results and mixing compositions of the compositions for forming the surface layer are shown in the following table.

(Image Evaluation)

The fabricated charging roll was attached to a cartridge of a real machine ("CLJ4525dn" manufactured by HP Development Company, L.P.), and image production was performed under 15° C.×10% RH boundary. The case in which In Comparative Example 1, since the binder resin was the urethane resin, generation of bleeding was not suppressed. The binder resin was the fluororesin and the dispersant was not used in Comparative Examples 2 to 4 or the dispersant was merely any one of the ester-based polymer dispersant and the sulfonic acid-based dispersant, dispersion of the carbon black deteriorated, and the light and shade nonuniformity and the resistance nonuniformity were not suppressed. In Comparative Example 5, since the dispersant used together with the ester-based polymer dispersant was not the sulfonic acid-based dispersant that was the polyether phosphate ester, dispersion of the carbon black deteriorated, and the light and shade nonuniformity and the resistance nonuniformity were not suppressed. In Comparative Example 6, since the dispersant used with the sulfonic acid-based dispersant was the ether-based polymer dispersant rather than the ester-based polymer dispersant, dispersion of the carbon black deteriorated, and the light and shade nonuniformity and the resistance nonuniformity were not suppressed. In Comparative Example 7, since the dispersant was a combination of the ester-based polymer dispersant and the polyether phosphate ester, dispersion of the carbon black deteriorated, and the light and shade nonuniformity and the resistance nonuniformity were not suppressed. In Comparative Example 8, while the dispersant was a combination of the acryl-based polymer dispersant and the phthalocyanine compound (containing a sulfonate group), since the binder resin was the fluororesin, dispersion of the carbon black deteriorated, and the light and shade nonuniformity and the resistance nonuniformity were not suppressed.

In comparison with the comparative examples, in the examples, since the fluororesin or the fluorine-modified acryl resin was contained as the binder resin and the ester-based polymer dispersant and the sulfonic acid-based dispersant were combined and used as the dispersant with respect to the binder resin and the carbon black, generation of bleeding was suppressed, dispersion of the carbon black was good, and the light and shade nonuniformity and the resistance nonuniformity were suppressed.

The present disclosure provides a charging roll for an electrophotographic apparatus including a shaft body; an elastic body layer formed on an outer circumference of the shaft body; and a surface layer formed on an outer circumference of the elastic body layer. The surface layer contains the following (A) to (D): at least one resin (A) selected from fluororesins and fluorine-modified acryl resins, a carbon black (B), an ester-based polymer dispersant (C), and a sulfonic acid-based dispersant (D).

According to the embodiment of the present disclosure, the sulfonic acid-based dispersant (D) is a phthalocyanine compound having a sulfonate group. According to the embodiment of the present disclosure, the ester-based polymer dispersant (C) has a carboxylic acid group or an amide group. According to the embodiment of the present disclosure, a content of the resin (A) is 50 wt % or more with respect to the entire binder resin of the surface layer. According to the embodiment of the present disclosure, a particle diameter of the carbon black (B) is within a range of 0.01 to 5 μm. According to the embodiment of the present disclosure, the surface layer further contains an acryl resin in addition to the resin (A). According to the embodiment of the present disclosure, a weight ratio of the ester-based polymer dispersant (C) and the sulfonic acid-based dispersant (D) is within a range of (C):(D)=1:1 to 4:1. According to the embodiment of the present disclosure, the resin (A) has solubility in a solvent.

According to the charging roll for an electrophotographic apparatus of the present disclosure, since one or more resins selected from the fluororesins and the fluorine-modified acryl resins are used as the binder resin of the surface layer, a barrier property can be increased and bleeding of the base component can be suppressed. Then, since the polymer dispersant is used with respect to the carbon black, aggregation of the carbon black can be suppressed by a steric hindrance thereof. Further, the ester-based polymer dispersant and the fluororesin and fluorine-modified acryl resin can be compatibilized using the ester-based polymer dispersant as the polymer dispersant while using the sulfonic acid-based dispersant having the same potential as the fluororesin or the fluorine-modified acryl resin, an electric potential of which easily becomes negative, and as a result, the carbon black can be highly dispersed in the fluororesin or the fluorine-modified acryl resin. Accordingly, uniform resistance is obtained.

While the embodiment and the examples of the present disclosure have been described above, the present disclosure is not limited to the embodiment and the examples, and various modifications may be made without departing from the spirit of the present disclosure.

What is claimed is:

1. A charging roll for an electrophotographic apparatus, comprising:
 a shaft body;
 an elastic body layer formed on an outer circumference of the shaft body; and
 a surface layer formed on an outer circumference of the elastic body layer, the surface layer containing:
  at least one resin (A) having solubility in a solvent and selected from fluororesins and fluorine-modified acryl resins,
  a carbon black (B) having a particle diameter within a range of 0.01 to 5 μm,
  an ester-based polymer dispersant (C) having a carboxylic acid group or an amide group,
  a sulfonic acid-based dispersant (D) which is a phthalocyanine compound having a sulfonate group, and
  an acryl resin in addition to the resin (A),
 wherein a content of the resin (A) is 50 wt % or more with respect to an entire binder resin of the surface layer, and
 a weight ratio of the ester-based polymer dispersant (C) and the sulfonic acid-based dispersant (D) is within a range of (C):(D)=1:1 to 4:1.

* * * * *